United States Patent
DeMaris et al.

(10) Patent No.: US 10,921,974 B2
(45) Date of Patent: Feb. 16, 2021

(54) USING DRAG AND DROP TO APPLY METADATA

(71) Applicant: Microsoft Technology Licensing, LLC, Redmond, WA (US)

(72) Inventors: John Lincoln DeMaris, Seattle, WA (US); Aditi Mandal, Bothell, WA (US); Benjamin N Truelove, Lynnwood, WA (US); Victor Poznanski, Samammish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 447 days.

(21) Appl. No.: 15/085,476

(22) Filed: Mar. 30, 2016

(65) Prior Publication Data

US 2017/0285901 A1 Oct. 5, 2017

(51) Int. Cl.
*G06F 3/0486* (2013.01)
*G06F 16/16* (2019.01)
*G06F 3/0482* (2013.01)
*G06F 3/0481* (2013.01)

(52) U.S. Cl.
CPC .......... *G06F 3/0486* (2013.01); *G06F 3/0482* (2013.01); *G06F 16/164* (2019.01); *G06F 16/168* (2019.01); *G06F 3/04817* (2013.01)

(58) Field of Classification Search
CPC ... G06F 3/00; G06F 17/30; G06F 3/12; G06F 3/048; G06F 16/16
See application file for complete search history.

(56) References Cited

U.S. PATENT DOCUMENTS

| | | | |
|---|---|---|---|
| 7,296,025 B2 | 11/2007 | Kung et al. | |
| 7,434,170 B2 | 10/2008 | Novak et al. | |
| 7,823,077 B2 | 10/2010 | Kurtz et al. | |
| 8,990,151 B2 | 3/2015 | Savage | |
| 2003/0009550 A1* | 1/2003 | Taylor ................. | G06F 17/3015 709/224 |

(Continued)

OTHER PUBLICATIONS

BA Insight, "SharePoint Search Autoclassifying Content Inside and Outside of SharePoint", retrieved on: Dec. 14, 2015, available at: <<http://bainsight.com/sharepoint-search/autoclassifying-content-sharepoint>>, 5 pages.

(Continued)

*Primary Examiner* — Jennifer N To
*Assistant Examiner* — Qi Wan
(74) *Attorney, Agent, or Firm* — Michael Best & Friedrich LLP

(57) ABSTRACT

Techniques directed to applying metadata to content items are described herein. The techniques may include displaying a graphical element associated with a metadata attribute(s) and displaying a visual representation for a content item(s). The graphical element may be associated with a group of content items that have a common metadata attribute. In some instances, the graphical element may be dragged and dropped onto the visual representation to associate the content item(s) with the metadata attribute(s). In other instances, the visual representation may be dragged and dropped on the graphical element to associate the content item(s) with the metadata attribute(s).

14 Claims, 5 Drawing Sheets

(56) References Cited

U.S. PATENT DOCUMENTS

| | | | |
|---|---|---|---|
| 2004/0145611 A1* | 7/2004 | Ogawa | G06T 11/60 715/765 |
| 2004/0193621 A1 | 9/2004 | Moore et al. | |
| 2004/0250028 A1* | 12/2004 | Daniels | G06F 11/0727 711/156 |
| 2005/0022132 A1* | 1/2005 | Herzberg | G06F 17/30109 715/759 |
| 2005/0131902 A1* | 6/2005 | Saika | G06F 16/10 |
| 2005/0203976 A1 | 9/2005 | Hyun et al. | |
| 2006/0070007 A1 | 3/2006 | Cummins et al. | |
| 2006/0212806 A1* | 9/2006 | Griffin | G06F 17/218 715/206 |
| 2007/0086038 A1* | 4/2007 | Matsuzaki | G06F 3/1208 358/1.13 |
| 2007/0088689 A1* | 4/2007 | Cras | G06F 17/30398 |
| 2007/0226689 A1* | 9/2007 | Schmidt | G06F 9/451 717/120 |
| 2008/0229222 A1* | 9/2008 | Kake | G06F 3/0481 715/764 |
| 2009/0089316 A1* | 4/2009 | Kogan | H04M 1/2748 |
| 2010/0017734 A1 | 1/2010 | Cummins et al. | |
| 2010/0095248 A1* | 4/2010 | Karstens | G06F 3/048 715/846 |
| 2010/0100523 A1 | 4/2010 | Marcy et al. | |
| 2010/0115446 A1* | 5/2010 | Fastabend | G06F 9/4443 715/772 |
| 2010/0185986 A1* | 7/2010 | Quintanilla | G06F 3/04817 715/835 |
| 2011/0314044 A1 | 12/2011 | Dumais et al. | |
| 2012/0005167 A1* | 1/2012 | Khatawate | G06F 11/1456 707/654 |
| 2012/0185456 A1* | 7/2012 | Hart | G06F 16/16 707/706 |
| 2012/0185794 A1* | 7/2012 | Qin | G06F 3/04842 715/779 |
| 2012/0331091 A1* | 12/2012 | Tseng | H04L 67/06 709/217 |
| 2013/0097115 A1* | 4/2013 | Savage | G06F 16/14 707/610 |
| 2013/0097554 A1* | 4/2013 | Wyeld | G06F 17/30554 715/782 |
| 2013/0311912 A1* | 11/2013 | Aso | H04N 21/42684 715/762 |
| 2015/0142859 A1 | 5/2015 | Haon et al. | |
| 2015/0180833 A1* | 6/2015 | Snow | G06F 21/6245 713/155 |
| 2016/0034114 A1* | 2/2016 | Lee | G06F 3/0481 715/804 |
| 2017/0017779 A1* | 1/2017 | Huang | G06F 40/106 |

OTHER PUBLICATIONS

Curran, "Automatically Create Document Metadata", available at: <<http://www.sharepointeurope.com/blog/2015/5/25/automatically-create-document-metadata>>, Published on: May 25, 2015, 8 pages.

Laserfiche.com, "How to keep meta data synced between documents and folders?", retrieved on Feb. 20, 2016, available at <<https://answers.laserfiche.com/questions/52751/How-to-keep-meta-data-synced-between-documents-and-folders>>, 5 pages.

M-Files, "Metadata-Driven Document Management", available at: <<http://www.m-files.com/folderless-metadata-driven>>, Published on: May 12, 2013, 2 pages.

MS Office, "Configure the Content Organizer to route documents", retrieved on: Dec. 14, 2015, available at: <<https://support.office.com/en-us/article/Configure-the-Content-Organizer-to-route-documents-b0875658-69bc-4f48-addb-e3c5f01f2d9a>>, 3 pages.

Oracle.com, "Fusion Middleware Using Oracle WebCenter Content: Desktop", retrieved on Feb. 20, 2016, available at <<https://docs.oracle.com/cd/E28280_01/doc.1111/e10624/folders _files.htm#DISUS285>>, 16 pages.

Oracle.com, "Understanding Applications and Metadata", available at: <<http://docs.oracle.com/cd/E23943_01/user.1111/e12783/c02_metadata.htm#IPMUS124>>, published on: Aug. 30, 2012, 4 pages.

Quadax, "Indexing for Enterprise Content Management", available at: <<http://www.quadax.com/ecm/Indexing.htm>>, published on: May 18, 2009, 1 page.

The RandGroup, LLC, "Automatic Metadata in SharePoint with Smart Folders", available at <<http://www.dynamics101.com/2013/02/metadata-in-sharepoint/>>, Feb. 12, 2013, 13 pages.

"International Search Report and Written Opinion Issued in PCT Application No. PCT/US2017/024213", dated Jun. 30, 2017, 11 Pages.

"Office Action Issued in European Patent Application No. 17717576.7", dated Jan. 13, 2020, 6 Pages.

* cited by examiner

USING DRAG AND DROP TO APPLY METADATA

BACKGROUND

Metadata provides many functions to both computer systems, which use metadata to classify data and drive system operations, and end users, which use metadata targeting actions to organize and target particular sets of files. Moreover, as the metadata within a computing system becomes more detailed, the system operations and actions that utilize the metadata can in turn become more refined. As such, the overall performance and user experience of computing systems can be greatly improved by the presence of a high density of metadata. However, current methods for modifying and adding metadata to items are time consuming, as they require users to modify metadata on a file by file basis via the use of form/menu interfaces. This discourages end users from updating incorrect/outdated metadata values or adding new layers of metadata complexity.

SUMMARY

This application describes techniques to enable users to add and/or modify metadata associated with content items using drag and drop gestures and other types of gestures. In some instances, the techniques herein utilize graphical elements associated with one or more metadata tags to enable end users to update and/or add metadata values associated with a content item. For example, a user interface may display a graphical element associated with one or more metadata attributes. The end user may then drag and drop a visual representation of a content item onto the graphical element (or, alternatively drag-and-drop the graphical element onto the visual representation of the content item), to associate the content item with the one or more metadata attributes. In some instances, end users can customize metadata attributes associated with a graphical element. The customized metadata attributes can then be associated with a grouping of content items associated with the graphical element.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Overview

Figure 1:
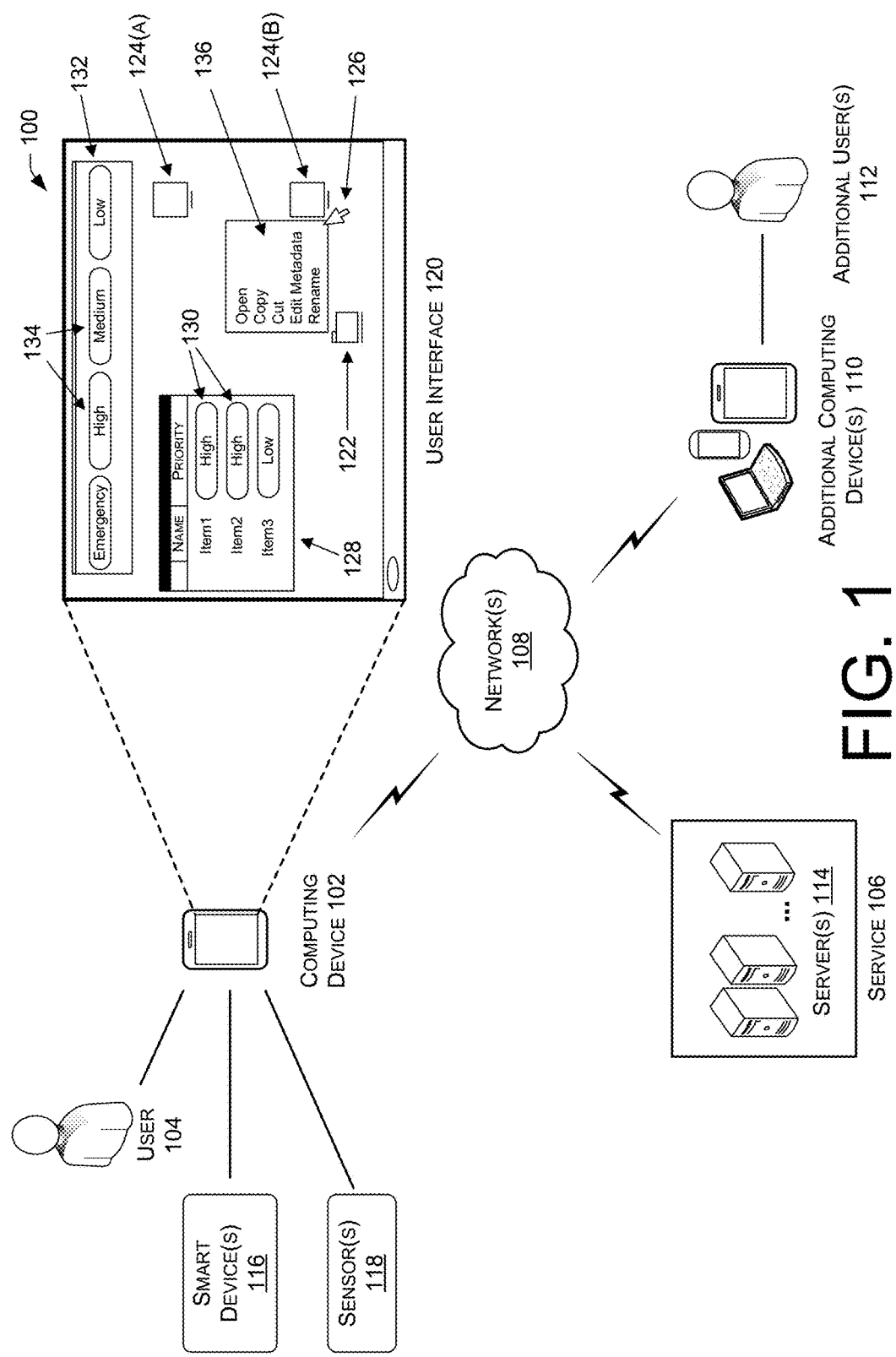
FIG. 1 is a schematic diagram of an example architecture for updating metadata associated with a content item(s) using a drag and drop gesture.

This application describes techniques for adjusting metadata associated with a content item(s) using a drag and drop gesture or other types of gestures. For instance, the techniques may include a user interface (UI) event that includes a drag and drop of a visual representation of a content item in a UI onto a graphical element in the UI that corresponds to a metadata attribute. In response to this UI event, the computing system may cause the content item to be associated with the metadata attribute. In other instances, the same association may be formed by a UI event that includes a drag and drop of the graphical element corresponding to the metadata attribute onto the visual representation of the content item. In some examples, multiple metadata attributes or multiple content items may be updated with a single drag and drop gesture. The techniques described herein enable users to quickly update, add, or otherwise modify metadata associated with one or more content items. This may be useful in a variety of contexts, such as in generating metadata for a content item, updating existing metadata for a content item, and so on.

Metadata is generally data that provides an underlying definition or description of the data to which it is associated. In some instances, metadata is defined as either structural metadata or descriptive metadata. Metadata may include fields (e.g., elements associated with a content item) and attributes defining values for the fields. For example, a metadata field may include a file type, a permission, a Boolean, a genre of music, a date a file was created, a file size, a date a file was last modified, a name of a file, an author of a file, a location, an album, etc. While a metadata attribute may be a value for the metadata field. For example, a file that includes a metadata field representing "file type," may include a metadata attribute of "JPEG" for the metadata field. As another example, a file that includes a metadata field representing "date last modified," may include a metadata attribute of "Apr. 6, 2014."

Metadata can be used in a variety of manners. For instance, metadata may control the audience of users that can view a content item, drive permissions regarding who can edit the content item, drive file retention, determine applicable workflow processes for the content item, etc. In some instances, metadata may be represented with a metadata tag (e.g., a digital and/or visual representation of a metadata field or value that may be displayed).

As noted above, the present application describes techniques for enabling users of a computing device to adjust metadata associated with a content item using a drag and drop gesture. The techniques may update a metadata attribute and/or a metadata field of a content item in various manners. In one example, an existing metadata attribute for a content item is updated with a new value. To illustrate, assume a file icon represents a file that includes a metadata field of "location" and a metadata attribute of "New York City." If the file icon is dragged and dropped onto a folder icon that include multiple files having a metadata attribute of "Seattle" for the metadata field of "location," the metadata attribute of "New York City" for the file may be updated to "Seattle." In another example, a new metadata field and/or attribute is added to a content item that did not already include the metadata field. To illustrate, assume that the same file does not include a metadata field for "Viewer Permission" (indicating who can view the file), and the files in the folder are associated with a metadata attribute of "Administrator" for the "Viewer Permission" field. If the file icon is dragged and dropped on the folder icon, the file may now be associated with a new field and a new attribute, namely the "Viewer Permission" field and the "Administrator" attribute. In yet another example, a new version or copy of a content item may be created with updated metadata. Here, a drag and drop of a visual representation of a content item onto a graphical element associated with a metadata attribute may cause a new version or copy of the content item to be created. The new version or copy of the content item may have the metadata attribute associated with the graphical element, as well as any other attributes that were associated with the initial version or copy of the content item (e.g., metadata values that do not conflict with the metadata values of the graphical element). The new version or copy of the content item may be displayed with a new visual representation.

In some instances, such as where a visual representation is associated with an application or data source (e.g., sensor, email account, website, microblog account, social media account, smart device, etc.), metadata associated with the application or data source may be updated. For instance, a UI may display an icon of a particular application that is associated with a home fire system located in a user's home. If the icon for the application is dragged and dropped onto a graphical element associated with a metadata attribute of "EMERGENCY" (or vice versa), the home fire system may now be associated with a metadata attribute of "EMERGENCY," as well as any other applications or systems that are associated with the particular application, such as an application for an alarm system to the user's home. Here, the other applications or systems may be linked to the particular application. Further, such association with the metadata attribute of "EMERGENCY" may cause a series of actions (e.g., transmitting an alert to a user computing device, notifying 911, etc.).

Further, in some instances a drag and drop gesture may cause one or more metadata attributes to be associated with one or more nested content items. For example, a UI may display a visual representation of a first folder that includes a second folder (e.g., a folder nested within the first folder). A UI event where the visual representation of the first folder is dragged and dropped onto a graphical element associated with one or more metadata attributes may trigger the computing device to associate the one or more metadata attributes with files that are included in both the first folder and the second folder.

In some implementations, a UI is presented on a display of a computing device to facilitate the techniques described herein. The UI may be implemented as part of an operating system (e.g., a file system directory interface, a desktop view, etc.), an application, a browser, and so on. The UI may present one or more visual representations of content items. The UI may also present one or more graphical elements that are associated with one or more metadata attributes. Although visual representations and graphical elements are often described with separate terms, in many instances the visual representations and graphical elements may refer to the same or similar types of graphical components, including, for example, icons, tiles, textual content, or other visual content.

In many instances, the systems and processes described herein enable end users to quickly adjust metadata associated with a content item (or many content items simultaneously) via gestures on a UI. Not only does this improve the user experience of modifying metadata, but the ease at which by the techniques described herein allow metadata attributes to be added and/or updated allows for a proliferation of user created/updated metadata. Additionally, because metadata is often used to drive system processes, organize files, enable targeting of files, etc., this proliferation of metadata enables more targeted and/or refined processes and/or actions, which in turn greatly improves the overall performance and user experience of computing systems.

The techniques described herein may be implemented in whole or in part by any computing device, or any combination of one or more elements thereof. By way of example and not limitation, illustrative systems and devices suitable for implementing the techniques are described below with reference to the figures.

Example Architecture

FIG. 1 is a schematic diagram of an example architecture 100 for updating metadata associated with a content item(s) using a drag and drop gesture. Additional details of individual features illustrated in FIG. 1 are described in more detail with reference to subsequent figures.

The architecture 100 includes a computing device 102 associated with a user 104. The computing device 102 may be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, a smart device having a touchscreen interface, and so forth. The computing 102 may be in communication with a service 106 via a network 108 such as, for example, the internet or a local wireless network. The architecture 100 further includes one or more additional computing devices 110 (i.e., laptops, tablets, smartphones, gaming consoles, etc.) associated with the user 104 or one or more additional users 112. The service 106 may be implemented or hosted by one or more servers, server farms, data centers, or other computing devices. In the illustrated example, the service 106 is implemented by one or more servers 114. The computing device 102 may further be associated with one or more smart devices 116 (e.g., devices that interact with the computing device 102, such as smart refrigerators, electronic vacuums, electronic pet food dispensers, personal activity devices, or other smart appliances or devices) and/or sensors 118 (e.g., fire alarms, cameras, temperature sensors, etc.).

The computing device 102 may include one or more processing units and memory communicatively coupled to the one or more processing unit(s). Data stored on the memory of the client device 102 may include an operating system, one or more applications, content data associated with content items, and/or metadata associated with the content items and/or applications. Examples of applications may include a social networking application, a media player, a game, an email or messaging application, a word processing application, a spreadsheet application, a database application, a photo or camera application, a shopping application, an application associated with a smart device 116 and/or sensor 108 that are associated with the computing device 102, etc. The applications may include native applications (e.g., applications that are preloaded on the client device when it ships), and/or third party applications that have been installed prior to or after a first logon to the device. Examples of content items may include files, data feeds, documents (e.g., word processing documents, slide shows, spreadsheets, etc.), emails, folders, applications, images, music, videos, electronic books (eBooks), or any other content.

The computing device 102 may further include a display upon which a user interface (UI) 120 can be displayed. The UI 120 may include a graphical element 122 associated with one or more metadata attributes (e.g., a folder). The computing device 102 may display the UI 120 as part of an operating system, an application UI, a browser (e.g., as part of an online content management system), and/or as part of a metadata editing UI. The user 104 may interact with the UI 120 through touch, text, speech, or other input.

The UI 120 may also include visual representations 124(A) and 124(B) representing one or more content items (e.g., files, applications, documents, emails, etc.). In some instances, the visual representation 124(A) may be associated with a first content item, and the visual representation 124(B) may be associated with a second content item. The computing device 102 may detect a UI event corresponding to a drag and drop of the visual representation 124(A) onto the graphical element 122. The visual representation 124(A) may be dragged and dropped via touchscreen input, manipulation of a pointer 126, etc. The detection of the UI event may trigger the computing device 102 to perform an operation in which the one or more metadata attributes associated with the graphical element 122 are associated with the first content item. Alternatively, or in addition, a UI event corresponding to a drag and drop of the graphical element 122 onto visual representation 124(B) may trigger the computing device 102 to perform an operation in which the one or more metadata attributes associated with the graphical element 122 are associated with the second content item. Further, in some instances the visual representation 124(A) may be dragged and dropped onto the visual representation 124(B) to cause metadata of the first content item and/or the second content item to be updated.

In some instances, where the visual representation 124(A) is associated with an application or data source (e.g., the sensor 118, email account, website, microblog account, social media account, the smart device 116, etc.), dragging and dropping the visual representation 124(A) onto the graphical element 122 may trigger the computing device 102 to apply the one or more metadata attributes to any content items that are associated with the application/data source. Further, such drag and drop may cause the computing device 102 to generate a trigger that causes the computing device 102 to apply the one or more metadata attributes to any content items that are subsequently generated and/or received via the application/data source at a future time.

In some embodiments, the graphical element 122 may be a group graphical element that represents a collection of one or more content items that have a common set of metadata attributes. For example, group graphical element 122 may be a UI tile (e.g., folder) associated with a file system directory for files having a set of metadata attributes in common. A UI event where the file system directory tile is dragged and dropped onto a document file icon (or vice versa) may cause the computing device 102 to apply the set of common metadata attributes to the document file.

In some instances, the UI 120 may present a file system directory interface 128 that includes one or more content items, and graphical elements 130 associated with metadata attributes of the one or more content items. The computing device 102 may detect a UI event corresponding to a drag and drop of one of the graphical elements 130 onto the visual representation 124(A), causing the metadata attribute that is associated with the graphical element 130 to be associated with the content item that is associated with the visual representation 124(A). For example, the graphical element 130 may correspond to a textual label of a metadata attribute of "High" in the metadata field "Priority." A drag and drop of the textual label onto a file icon associated with a content item may cause associate the metadata attribute "High" to be associated with the content item. In some instances, multiple graphical elements (e.g., textual labels) may be selected simultaneously and dragged and dropped to update metadata of a content item.

Moreover, in some instances the computing device 102 may provide a metadata editing UI 132. The metadata editing UI 132 may be presented in response to selection of an icon that triggers such UI, or constantly presented (e.g., along the top or other portion of the UI 120). The metadata editing UI 132 may be a window, a toolbar, a skin, etc., and may be integrated within an application, within an operating system (OS), and so on. The metadata editing UI 132 may include one or more graphical elements 134 associated with metadata attributes. An individual graphical element of the graphical elements 136 may be associated with one or more metadata attributes that are predefined by an application or operating system, created by a user, or a combination thereof. For example, the computing device 102 may determine that the user 104 commonly assigns the same set of metadata attributes to content items, and may cause an individual graphical element that is associated with the commonly assigned set of metadata attributes to be included within the metadata editing UI 132. Alternatively, or in addition, the user 104 may customize the metadata editing UI 132 by selecting metadata attributes to be represented in the metadata editing UI 132. Each of the graphical elements 134 may be individually, or collectively, selected and dragged and dropped onto a visual representation associated with a content item to associate the content item with the corresponding attribute of the graphical element 134.

In some instances, the computing device 102 may provide a selectable option menu 136 that enables the user 104 to edit/customize one or more metadata attributes associated with the graphical element 122. The editing/customizing may include changing the one or more metadata attributes and/or associating a new metadata attribute with the graphical element 122. For example, a user may edit or customize a graphical element associated with metadata attributes "Freshman History Class" and "Spring 2016" by adding a new metadata attribute of "Homework, Read pp. 123-210."

In some instances, the computing device 102 may present a notification that a metadata value associated with a content item may not be changed. For example, only certain user accounts may have permission to modify a metadata attribute corresponding to "review status" of a document. Thus, if the user 104 does not have the required permissions, and tries to edit the metadata corresponding review status with drag and drop input, the computing device 102 may present a notification that the user 104 does not have permission to make this change (and the update may be denied).

In some instances, the computing device 102 may upload a version of a content item to the service 106 and/or the additional computing device 110. For example, in response to a drag and drop event to update metadata of a content item, a version of the content item may be uploaded to the service 106 and/or the additional computing device 110 with updated metadata that is based on the drag and drop event. In such examples, the service 106 may be a cloud storage service where content items are made accessible to the computing device 102 and the additional computing device 110 via the network 108.

The techniques described herein may be performed by the service 106, the computing device 102, and/or the additional computing devices 110 (e.g., in a client context, server context, or a combination). In one example, one or more of the operations may be performed locally at the computing device 102. Here, the computing device 102 may provide functionality to display the user interface 120 (e.g., a file system directory interface), receive user input, and/or update metadata associated with a content item. In this example, the content item and/or metadata may be stored locally at the computing device 102. In another example, a content item and/or metadata may be stored at the service 106 (or the additional computing device 110). Here, the computing device 102 may send instructions to the service 106 (or the additional computing device 110) to update the metadata and/or the content item when a particular event occurs (e.g., a drag and drop to change metadata). In this example, the user interface 120 may be implemented via the service 106 (e.g., through an interface of an online site) or locally by the computing device 102. In yet other examples, the computing device 102, the service 106, and/or the additional computing device 110 may perform any combination of operations. As such, metadata may be associated with a content item by the computing device 102, the service 106, and/or the additional computing device 110.

Example System for Adjusting Metadata Using Drag and Drop

Figure 2:
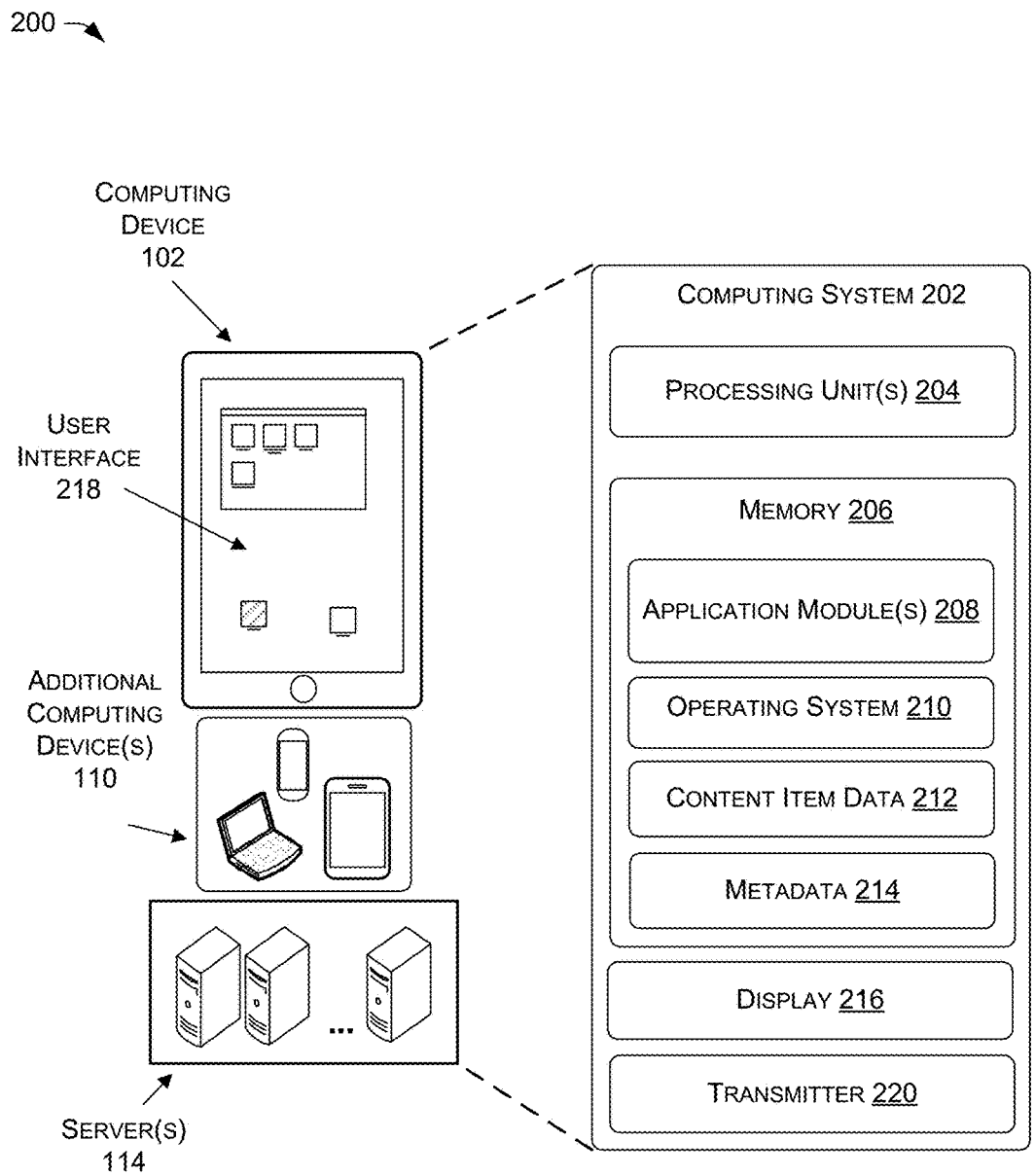
FIG. 2 is a schematic diagram illustrating an example system for adjusting metadata associated with a content item using drag and drop gestures.

FIG. 2 is a schematic diagram of an example architecture 200 for updating metadata associated with a content item(s) using a drag and drop gesture. In particular, FIG. 2 illustrates additional details of hardware and/or software components that may be used to implement such techniques. The computing system 202 may be implemented as one or more of a computing device 102, one or more additional computing device(s) 110, and/or one or more servers 114. Although illustrated as being included within a single system, any number of the elements of the computing system 202 may be distributed across multiple devices. Accordingly, unless otherwise specified, any action or step attributed to any individual hardware or software component may be performed by that component on one or more of the computing device 102, the additional electric device(s) 110, and/or the one or more servers 114. The computing system 202 is merely one example, and the techniques described herein are not limited to performance using the system 200 of FIG. 2.

In the example of FIG. 2, the computing system 202 includes one or more processing units 204 and a memory 206 communicatively coupled to the one or more processing unit(s) 204. The computing device 102 may be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 2 shows representative computing device 102 in the form of a tablet computer 102. However, this is merely an example, and the computing device 102 may take other forms.

The computing system 202 may include one or more application modules 208, an operating system 210, content item data 212, and metadata 214 stored in the memory 206. Application module(s) 208 may correspond to one or more applications, such as social networking applications, media players, games, email or messaging applications, word processing applications, spreadsheet applications, database applications, photo or camera applications, shopping applications, web browser, applications associated with smart devices 106 and/or sensors 108 that are associated with the computing system 202, etc., or a combination thereof. The computing system 202 may further include a display 216 upon which a user interface (UI) 218 can be displayed. The UI 218 may be implemented as any type of UI, such as part of a metadata editing UI, a file system directory interface, a UI of an application, a UI of an operating system, and so on.

The application module 208 and/or operating system 210 may be executable by the one or more processing units 204 to cause one or more processing units 204 to display information on the UI 218 of the display 216. For example, the application module 208 may cause display of the UI 218 by passing a command through an appropriate data structure to the operating system 210, which can cause, through a device driver, hardware on the computing system 202 to perform some action, such as via one or more electrical signals from I/O interfaces to the peripheral hardware. The display 216 can receive display data via a display driver software.

A UI event can correspond to a touchscreen sensor detecting a touch of a touchscreen display with a finger, stylus, etc., or may correspond to a manipulation a pointer cursor within the UI 218 caused by a mouse, controller, motion sensor, video capture device, etc. In some instances, the computing system 202 may detect UI events via sensing hardware located on one or more of the computing device 102 and/or the additional computing device(s) 110. For example, the sensing hardware may respond to physical stimuli (including for example inertial motion changes, capacitive/pressure/mechanical changes indicating touch, incident light, sounds, etc.) in part by producing electronic or optical signals or commands which are provided to an I/O interface of the computing system 202; where the I/O interface is coupled to at least a processing unit of the one or more processing units 204. Data indicating the electronic/optical signals or commands are stored in a data structure (such as in a memory location or a processor register). Receipt of the electronic/optical signal may result in an interrupt event, which the processing unit and/or operating system 210 responds to by storing the data indicating the electronic/optical signals and providing a pointer to the data indicating the electronic/optical signals to an application module 208. The application module 208 and/or the operating system 210 may then utilize the pointer to read the data indicating the electronic/optical signal from the memory, and process the data to determine UI events for uses such as those described herein.

In some embodiments, the techniques described herein may be performed by a combination of the servers 114, the computing device 102, and/or the additional computing devices 110 (e.g., in a client context, server context, or a combination). In one example, one or more of the operations may be performed locally at the computing device 102. For example, the computing device 102 may provide functionality to display the user interface 218 (e.g., a file system directory interface), receive user input, and/or update metadata associated with a content item. In this example, the content item and/or metadata may be stored locally at the computing device 102. In another example, a content item and/or metadata may be stored at the servers 114 (or the additional computing device 110). Here, the computing device 102 may send instructions to the service 106 (or the additional computing device 110) via transmitter 220 to update the metadata and/or the content item when a particular event occurs (e.g., a drag and drop to change metadata). In some embodiments, the one or more content items may be stored on the memory 206 located in one or more of the computing device 102, the server(s) 114, and/or on one or more additional computing device(s) 110.

The one or more processing unit(s) 204 may be configured to execute instructions, applications, or programs stored in the memory 206. In some examples, the one or more processing unit(s) 204 may include hardware processors that include, without limitation, a hardware central processing unit (CPU), a graphics processing unit (GPU), and so on. While in many instances the techniques are described herein as being performed by the one or more processing unit 204, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 206 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as the computing device 102, the additional computing devices 110, or the servers 114. In general, computer storage media may include computer-executable instructions that, when executed by one or more processing units, cause various functions and/or operations described herein to be performed.

In contrast, communication media embodies computer-readable instructions, data structures, program modules, or other data in a modulated data signal, such as a carrier wave, or other transmission mechanism. As defined herein, computer storage media does not include communication media.

Additionally, the transmitter 220 includes physical and/or logical interfaces for connecting the respective computing device(s) to another computing device or a network. For example, the transmitter 220 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
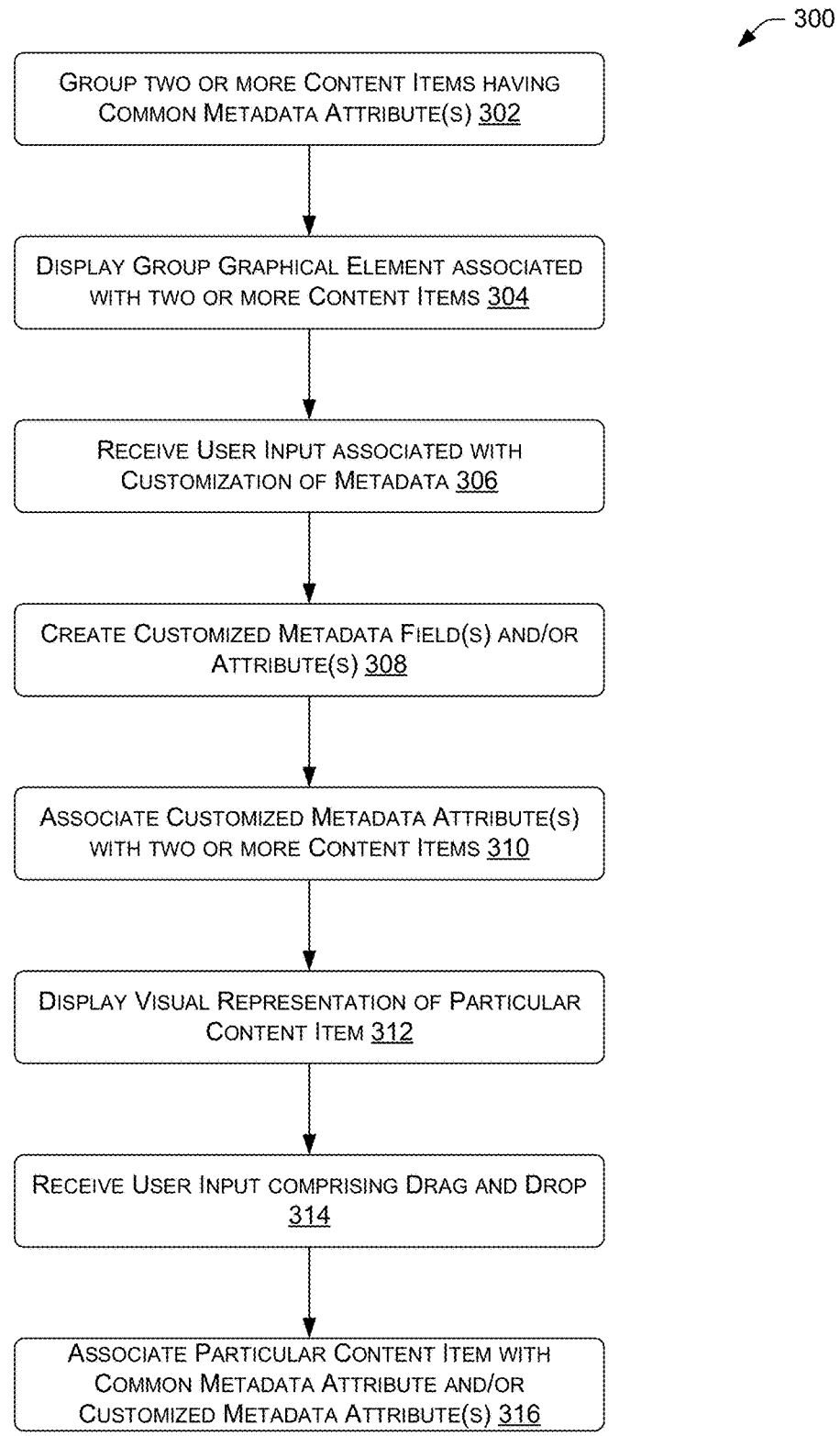
FIG. 3 is a flowchart illustrating an example process for adjusting metadata associated with a content item using drag and drop gestures.

Example Processes for Adjusting Metadata Associated with a Content Item(s) Using Drag and Drop Gestures FIG. 3 illustrates a flowchart of an example process 300 for adjusting metadata associated with a content item. One or more steps of process 300 may be performed by a service over a backend content delivery network (e.g., the cloud), as a local process by a computing device, as a local process by an additional computing device, or by a combination thereof. For ease of illustration, the operations of the process 300 will be described as being performed by a computing device.

As shown in FIG. 3, at operation 302, the computing device groups two or more content items having a common metadata attribute. As one example, the grouping may include a user selecting multiple content items having a same metadata attribute. As another example, the grouping may include defining a folder or other data structure to include content items that have a particular metadata attribute. As yet another example, a user may search for content items that include a particular attribute, and select the results to form a group.

At operation 304, the computing device displays a group graphical element associated with the two or more content items. As one example, the group graphical element may include a folder icon or other visual element that includes multiple content items (e.g., the grouped content items). The group graphical element may be displayed and/or generated based at least in part on user input selecting multiple content items to form a group. In some instances, the group graphical element may be displayed upon selecting multiple content items and providing input (e.g., via a right-click popup window) to generate the group graphical element.

At operation 306, the computing device receives user input associated with customization of metadata. As one example, a user may provide input (e.g., via a pop-up window) to add a new metadata field and/or attribute to a group of content items. To illustrate, a user may right-click on a folder and request that content items within the folder be associated with a new field of "Review Status" and an attribute of "Not Yet Reviewed." In this illustration, the attribute may be associated with a category of data.

At operation 308, the computing device creates one or more customized metadata fields and/or attributes. The computing device may create the one or more customized metadata attributes based on the user input received at 306. Creating a customized metadata attribute may include generating a metadata field and/or attribute.

At operation 310, the computing device associates one or more customized metadata attributes with two or more content items (e.g., the two or more content items of the group graphical element). To illustrate, the computing device may associate multiple content items within a folder with a new field of "Review Status" and a new attribute of "Not Yet Reviewed." Operation 310 may include updating metadata stored in memory of one or more of the computing device, the service, and/or the one or more additional computing devices.

At operation 312, the computing device displays a visual representation of a particular content item. As one example, the computing device may display a file icon on a desktop view (or elsewhere) of the computing device to represent a file (or other data).

At operation 314, the computing device receives user input comprising a drag and drop. As one example, the visual representation for the particular content item is dragged and dropped onto the group graphical element. As another example, the group graphical element is dragged and dropped onto the visual representation for the particular content item.

At operation 316, the computing device associates the particular content item with the common metadata attribute (e.g., of the grouped content items) and/or the one or more customized fields and/or attributes. This may include updating metadata stored in memory of one or more of the computing device, the service, and/or the one or more additional computing devices. The operation 316 may be based on the user input received at 314.

Figure 4:
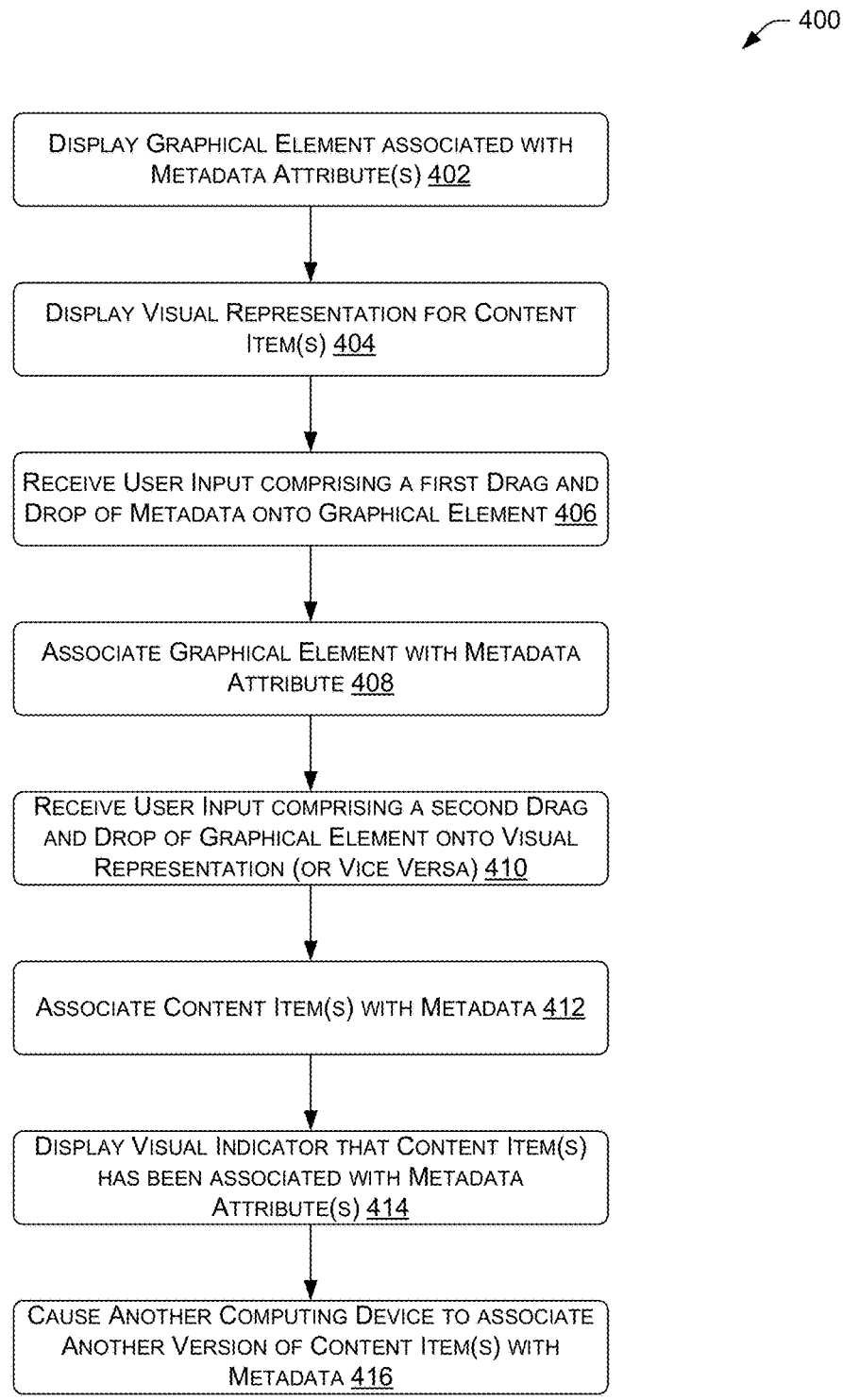
FIG. 4 is a flowchart illustrating another example process for adjusting metadata associated with a content item using drag and drop gestures.

FIG. 4 illustrates a flowchart of another example process 400 for adjusting metadata associated with a content item. One or more steps of process 400 may be performed by a service over a backend content delivery network (e.g., the cloud), as a local process by a computing device, as a local process by an additional computing device, or by a combination thereof. For ease of illustration, the operations of the process 400 will be described as being performed by a computing device.

At operation 402, the computing device displays a graphical element associated with one or more metadata attributes. As one example, the graphical element may comprise a folder icon representing a folder that is associated with a particular metadata attribute(s) (e.g., a folder that includes one or more content items of a same type). As another example, the graphical element may be displayed as another type of UI element, such as in window across the top of a metadata editing UI. As yet another example, the graphical element may be displayed within a file system directory interface. Here the graphical element may include textual content (e.g., a row or column with text) indicating that a file system directory is associated with a metadata attribute. To illustrate, in response to opening a folder, network drive, and so on, a file system directory may be displayed with a graphical element for a metadata attribute provided as a column.

At operation 404, the computing device displays a visual representation for one or more content items. As one example, the visual representation may comprise a file icon representing a file. As another example, the visual representation may be displayed as another type of UI element.

At operation 406, the computing device receives user input comprising a first drag and drop of metadata onto a graphical element. As one example, the user input may comprise a selection of an attribute displayed within a metadata editing interface and a drag and drop of the attribute onto a folder (e.g., to associate the folder with a new field and/or attribute). As another example, the user input may comprise a selection of textual content representing an attribute (e.g., a column in a file system direction) and a drag and drop of the textual content onto a folder.

At operation 408, the computing device associates the graphical element with the metadata based on the first drag and drop received at operation 406. As one example, a folder icon for a folder may be associated with a metadata attribute due to a drag and drop of the metadata attribute onto the folder. That is, the folder may be associated with a new metadata attribute (and/or field).

At operation 410, the computing device receives user input comprising a second drag and drop of the graphical element onto the visual representation (or a drag and drop of the visual representation onto the graphical element). As one example, a folder icon representing a folder may be dragged and dropped onto a file icon representing a file. As another example, a file icon representing a file may be dragged and dropped onto a folder icon representing a folder.

At operation 412, the computing device associates one or more content items with metadata (e.g., attributes and/or fields) based on the user input received at 410. As one example, a drag and drop of a folder icon for a folder onto a file icon for a file may cause the file to be associated with attributes that the folder represents. As another example, a drag and drop of textual content representing an attribute onto a file may cause the file to be associated with the attribute. As yet another example, a drag and drop of a file icon for a file onto a folder icon for a folder may cause the file to be associated with attributes that the folder represents (e.g., an entirety of attributes, a particular portion of attributes, two or more attributes, etc.).

At operation 414, the computing device displays a visual indicator that one or more content items have been associated with one or more metadata attributes. As one example, the visual indicator may be displayed within a pop-up window.

At operation 416, the computing device causes another computing device to associate another version of a content item with metadata. As one example, when metadata of a first version or copy of a content item is updated via a drag and drop gesture on a first device, metadata of a second version or copy of the same content item is updated on a second device. This may allow both devices to include the same metadata for the same content item (e.g., a content item that is the same, but stored as two different copies on separate devices).

The processes 300 and 400 may be performed within the architecture of FIG. 1. However, the processes 300 and 400 are not limited to being performed using the architecture 100. Moreover, the architecture 100 is not limited to performing the processes 300 and 400.

The processes 300 and 400 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the processes 300 and 400 may be combined in whole or in part.

The various techniques described herein may be implemented in the context of computer-executable instructions or software, such as program modules, that are stored in computer-readable storage and executed by the one or more processing unit(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined herein for purposes of discussion, the various functions and responsibilities might be distributed and divided in different ways, depending on circumstances.

Similarly, software may be stored and distributed in various ways and using different means, and the particular software storage and execution configurations described herein may be varied in many different ways. Thus, software implementing the techniques described herein may be distributed on various types of computer-readable media, not limited to the forms of memory that are specifically described.

Example User Interface

Figure 5:
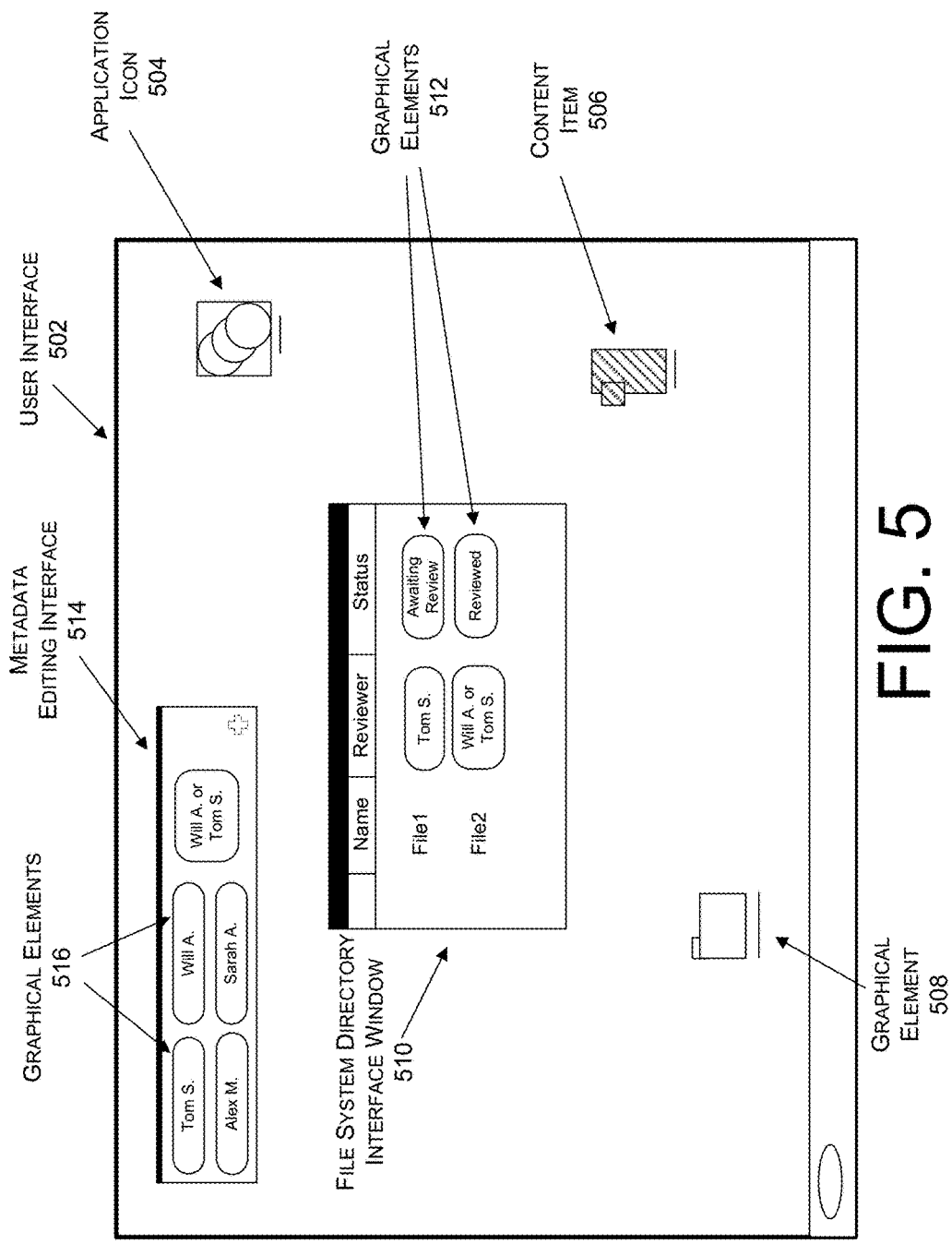
FIG. 5 is an example user interface for adjusting metadata associated with a content item using drag and drop gestures.

FIG. 5 illustrates an example user interface 502 for adjusting metadata associated with a content item using drag and drop gestures. The user interface 502 may be displayed on a display associated with a computing device (e.g., the computing device 102).

The user interface 502 may include, for example, an interactive start menu, as well as one or more other functional elements, such as menus, task bars, icons, etc. In some examples, the user interface 502 may include an application icon 504, as well as icons associated with content items (e.g., content item 506).

The user interface 502 may further include a graphical element 508. Graphical element 508 may be associated with one or more metadata attributes. In one instance, the graphical element 508 may be a group graphical element that represents a collection of one or more content items that have a common set of metadata attributes. The graphical element 508 may comprise an icon/tile located in a functional element of the display (e.g., menu), an icon/tile located in an application interface, and/or an icon/tile located on a desktop of the user interface 502. For example, the graphical element 508 may be a UI tile associated with a file system directory associated with files having a set of metadata attributes in common.

The user interface 502 may also include a file system directory interface window 510 that includes one or more content items, and one or more graphical elements 512 associated with metadata attributes. As illustrated, the file system directory interface window 510 includes columns of "Name," "Reviewer," and "Status" for representing metadata fields. The graphical elements 512 represent metadata attributes for metadata fields. Here, the file system directory interface window 510 displays metadata for two files.

The user interface 502 may also include a metadata editing interface 514. The metadata editing interface 514 may be a window, a toolbar, a skin, etc., and may be integrated within an application, an operating system (OS), and so on. The metadata editing interface 514 may include one or more graphical elements 516 associated with metadata attributes. In some embodiments, an attribute of a graphical element of the graphical elements 516 may be predefined by an application, operating system, and/or user.

In some embodiments, the application icon 504, the content item 506, the graphical element 508, the graphical elements 512, and/or the graphical elements 516 may be manipulated by a pointer (e.g., mouse pointer), touch input, or other input to drag and drop elements onto each other. Such drag and drop gestures may facilitate the techniques described herein.

EXAMPLES

Example A, a computing device, comprising: one or more processing units; and memory communicatively coupled to the one or more processing units, the memory storing instructions that, when executed by the one or more processing units, cause the one or more processing units to: group two or more content items of a set of content items, each of the two or more content items having a common metadata attribute; display, within a content management user interface, a group graphical element associated with the two or more content items; receive first user input associated with a customization of metadata; based at least in part on the first user input, create one or more customized metadata attributes; associate each content item of the two or more content items with the one or more customized metadata attributes; display a visual representation for a particular content item; receive second user input comprising a drag and drop of the visual representation onto the group graphical element; and based at least in part on the second user input, associate the particular content item with the common metadata attribute and with the one or more customized metadata attributes.

Example B, the computing device of example A, wherein the particular content item is a first particular content item, the visual representation is associated with a grouping of both the first particular content item and a second particular content item, and the instructions further cause the one or more processing units to, based at least in part on the second user input, associate the second particular content item with the common metadata attribute and with the one or more customized metadata attributes.

Example C, the computing device of any of examples A or B, wherein the instructions further cause the one or more processing units to, based at least in part on the second user input, display within the content management user interface a visual indicator that the particular content item has been associated with the common metadata attribute and with the one or more customized metadata attributes.

Example D, the computing device of any of examples A-C, wherein each of the one or more customized metadata attributes indicates a category of data.

Example E, the computing device of any of examples A-D, wherein the particular content item is a first version of the particular content item, and the instructions further cause the one or more processing units to: based at least in part on the second user input, cause a different computing device to associate a second version of the particular content item with the common metadata attribute and with the one or more customized metadata attributes, the second version of the particular content item being stored in memory of the different computing device.

Example F, the computing device of any of examples A-E, wherein the drag and drop is a first drag and drop, the particular content item is a first particular content item, and the instructions further cause the one or more processing units to: receive third user input comprising a second drag and a drop of the group graphical element onto a second particular content item; and based at least in part on the third user input, associate the second particular content item with the common metadata attribute and with the one or more customized metadata attributes.

Example G, the computing device of any of examples A-F, wherein the drag and drop is a first drag and drop, the particular content item is a first particular content item, and the instructions further cause the one or more processing units to: display, within the content management user interface, one or more metadata attributes associated with the two or more content items; receive third user input comprising: a selection of the one or more metadata attributes; and a second drag and a drop of the one or more metadata attributes onto a second particular content item; and based at least in part on the third user input, associate the second particular content item with the one or more metadata attributes.

Example H, a method comprising: displaying, by a computing device, a graphical element associated with two or more metadata attributes; displaying, by the computing device, a visual representation for a content item; receiving, by the computing device, user input comprising a drag and drop of the graphical element onto the visual representation; and based at least in part on the user input, associating, by the computing device, the content item with the two or more metadata attributes, wherein each of the one or more customized metadata attributes indicates a category of data.

Example I, the method of example H, wherein the content item is a first content item, the visual representation is associated with a grouping of both the first content item and a second content item, and wherein the method further comprises associating, based at least in part on the user input, the second content item with the two or more metadata attributes.

Example J, the method of any of examples H or I, further comprising based at least in part on the user input, displaying a visual indicator that the content item has been associated with the two or more metadata attributes.

Example K, the method of any of examples H-J, wherein: the graphical element associated with the two or more metadata attributes comprises a folder icon representing a folder that includes one or more content items of a same type, each of the one or more content items having the two or more metadata attributes; and the visual representation for the content item comprises a file icon representing the content item.

Example L, the method of any of examples H-K, wherein the content item is a first version of the content item, the method further comprising: based at least in part on the user input, causing a different computing device to associate a second version of the content item with the two or more metadata attributes, the second version of the content item being stored in memory of the different computing device.

Example M, the method of any of examples H-L, wherein: the displaying the graphical element comprises displaying the graphical element within a file system directory interface, the graphical element comprising textual content indicating that a file system directory is associated with the two or more metadata attributes; and the receiving the user input comprises receiving user input that includes a drag and drop of the textual content onto the visual representation for the content item.

Example N, the method of any of examples H-M, wherein the user input is first user input, the drag and drop is a first drag and drop, the content item is a first content item, and wherein the method further comprises: displaying, by the computing device and within a content management user interface, one or more metadata attributes associated with the graphical element; receiving, second user input comprising: a selection of the one or more metadata attributes, and a second drag and drop of the one or more metadata attributes onto a second content item; and based at least in part on the second user input, associating the second content item with the one or more metadata attributes.

Example O, a computing device, comprising: one or more processing units; and memory communicatively coupled to the one or more processing units, the memory storing instructions that based on execution by the one or more processing units, cause the one or more processing units to: display a graphical element associated with a metadata attribute; display a visual representation for a content item; receive user input comprising a drag and drop of the graphical element onto the visual representation; and based at least in part on the user input, associate the content item with the metadata attribute.

Example P, the computing device of example O, wherein the content item is a first content item, the visual representation is associated with a grouping of both the first content item and a second content item, and wherein the instructions further cause the one or more processing units to, based at least in part on the user input associate the second particular content item with the metadata attribute.

Example Q, the computing device of any of examples O or P, wherein the instructions further cause the one or more processing units to display a visual indicator that the content item has been associated with the metadata attribute.

Example R, the computing device of any of examples O-Q, wherein the drag and drop is a first drag and drop, and the instructions further cause the one or more processing units to: receive additional user input comprising a second drag and drop of an additional metadata attribute onto the graphical element; and based at least in part on the additional user input, associate the additional metadata attribute with the graphical element.

Example S, the computing device of any of examples O-R, wherein the content item is a first content item, and the instructions further cause the one or more processing units to: receive further user input comprising a third drag and drop of a second content item onto the graphical element; and based at least in part on the further user input, associate the second content item with the metadata attribute and the additional metadata attribute.

Example T, the computing device of any of examples O-S, wherein the content item is a first version of the content item, and the instructions further cause the one or more processing units to: based at least in part on the user input, cause a different computing device to associate a second version of the content item with the metadata attribute, the second version of the content item being stored in memory of the different computing device.

Example U, a computing system comprising: means for grouping two or more content items of a set of content items, each of the two or more content items having a common metadata attribute; means for displaying, within a content management user interface, a group graphical element associated with the two or more content items; means for receiving first user input associated with a customization of metadata; means for creating, based at least in part on the first user input, one or more customized metadata attributes; means for associating each content item of the two or more content items with the one or more customized metadata attributes; means for displaying a visual representation for a particular content item; receive second user input comprising a drag and drop of the visual representation onto the group graphical element; and means for associating, based at least in part on the second user input, the particular content item with the common metadata attribute and with the one or more customized metadata attributes.

Example V, the computing system of example U, wherein the particular content item is a first particular content item, the visual representation is associated with a grouping of both the first particular content item and a second particular content item, and further comprising means for associating, based at least in part on the second user input, the second particular content item with the common metadata attribute and with the one or more customized metadata attributes.

Example W, the computing system of any of examples U or V, further comprising means for displaying within the content management user interface a visual indicator that the particular content item has been associated with the common metadata attribute and with the one or more customized metadata attributes.

Example X, the computing system of any of examples U-W, wherein each of the one or more customized metadata attributes indicates a category of data.

Example Y, the computing system of any of examples U-X, wherein the particular content item is a first version of the particular content item, and further comprising means for causing, based at least in part on the second user input, a different computing device to associate a second version of the particular content item with the common metadata attribute and with the one or more customized metadata attributes, the second version of the particular content item being stored in memory of the different computing device.

Example Z, the computing system of any of examples U-Y, wherein the drag and drop is a first drag and drop, the particular content item is a first particular content item, and further comprising means for receiving third user input comprising a second drag and a drop of the group graphical element onto a second particular content item; and means for associating, based at least in part on the third user input, the second particular content item with the common metadata attribute and with the one or more customized metadata attributes.

Example AA, the computing system of any of examples U-Z, wherein the drag and drop is a first drag and drop, the particular content item is a first particular content item, and further comprising means for displaying, within the content management user interface, one or more metadata attributes associated with the two or more content items; means for receiving third user input comprising: a selection of the one or more metadata attributes; and a second drag and a drop of the one or more metadata attributes onto a second particular content item; and means for associating, based at least in part on the third user input, the second particular content item with the one or more metadata attributes.

Example BB, a computing device, comprising means for causing the one or more processing units to: display a graphical element associated with a metadata attribute; means for displaying a visual representation for a content item; means for receiving user input comprising a drag and drop of the graphical element onto the visual representation; and means for associating, based at least in part on the user input, the content item with the metadata attribute.

Example CC, the computing device of example BB, wherein the content item is a first content item, the visual representation is associated with a grouping of both the first content item and a second content item, and further comprising means for associating, based at least in part on the user input, the second particular content item with the metadata attribute.

Example DD, the computing device of any of examples BB or CC, further comprising means for displaying a visual indicator that the content item has been associated with the metadata attribute.

Example EE, the computing device of any of examples BB-DD, wherein the drag and drop is a first drag and drop, and further comprising means for receiving additional user input comprising a second drag and drop of an additional metadata attribute onto the graphical element; and means for associating, based at least in part on the additional user input, the additional metadata attribute with the graphical element.

Example FF, the computing device of any of examples BB-EE, wherein the content item is a first content item, and further comprising means for receiving further user input comprising a third drag and drop of a second content item onto the graphical element; and means for associating, based at least in part on the further user input, the second content item with the metadata attribute and the additional metadata attribute.

Example GG, the computing device of any of examples BB-FF, wherein the content item is a first version of the content item, and further comprising means for causing, based at least in part on the user input, a different computing device to associate a second version of the content item with the metadata attribute, the second version of the content item being stored in memory of the different computing device.

CONCLUSION

Although the various examples have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
one or more processing units; and
memory communicatively coupled to the one or more processing units, the memory storing instructions that, when executed by the one or more processing units, cause the one or more processing units to:
receive a selection from a user of two or more content items, each of the two or more content items having two or more common metadata attributes prior to the selection;
in response to the selection of the two or more content items, automatically create a group including the two or more content items and display, within a content management user interface, an icon representing the group, wherein metadata of the icon includes the two or more common metadata attributes of the two or more content items;
receive a user input comprising a drag and drop of the icon onto a visual representation of an additional content item; and
in response to the drag and drop of the icon onto the visual representation of the additional content item, automatically update metadata of the additional content item with the two or more common metadata attributes of the group.

2. The computing device of claim 1, wherein the instructions further cause the one or more processing units to, in response to the drag and drop of the icon onto the visual representation of the additional content item, display within the content management user interface a visual indicator that the metadata of the additional content item has been updated with the two or more common metadata attributes.

3. The computing device of claim 1, wherein the user input is first user input and wherein the instructions further cause the one or more processing units to receive second user input including one or more additional metadata attributes for the group and updating the metadata of the group with the one or more additional metadata attributes and automatically, in response to receiving the second user input, update the metadata of each content item of the two or more content items with the one or more additional metadata attributes of the group, wherein each of the one or more additional metadata attributes indicates a category of data.

4. The computing device of claim 1, wherein the additional content item is a first version of the additional content item, and the instructions further cause the one or more processing units to:
in response to the drag and drop, cause a different computing device to update metadata of a second version of the additional content item with the two or more common metadata attributes, the second version of the additional content item being stored in memory of the different computing device.

5. A method comprising:
receiving a selection from a user of two or more content items, each of the two or more content items have two or more common metadata attributes prior to the selection;
in response to the selection of the two or more content items, automatically creating a group including the two or more content items and displaying, by a computing device, an icon representing the group, with metadata of the icon including the two or more common metadata attributes;
receiving, by the computing device, a user input comprising a drag and drop of the icon onto a visual representation of an additional content item; and
in response to the drag and drop of the icon onto the visual representation, automatically updating, by the computing device, metadata of the additional content item with the two or more common metadata attributes of the group.

6. The method of claim 5, further comprising, in response to the drag and drop, displaying a visual indicator that the additional content item has been updated with the two or more common metadata attributes.

7. The method of claim 5, wherein:
the icon comprises a folder icon representing a folder that includes the two or more content items; and
the visual representation for the additional content item comprises a file icon representing the additional content item.

8. The method of claim 5, wherein the additional content item is a first version of the additional content item, the method further comprising:
in response to the drag and drop, causing a different computing device to update metadata of a second version of the additional content item with the two or more common metadata attributes, the second version of the additional content item being stored in memory of the different computing device.

9. The method of claim 5, wherein:
the displaying the icon comprises displaying the icon within a file system directory interface, the icon comprising textual content indicating the two or more) common metadata attributes; and
the receiving the drag and drop comprises receiving a drag and drop of the textual content onto the visual representation for the additional content item.

10. The method of claim 5, wherein the method further comprises:
displaying, by the computing device and within a content management user) interface, the two or more common metadata attributes of the group;
receiving, second user input comprising a selection of one or more metadata attributes and a second drag and drop of the one or more metadata attributes onto a second additional content item; and
based at least in part on the second user input, updating metadata of the second additional content item with the one or more metadata attributes.

11. A computing device, comprising:
one or more processing units; and
memory communicatively coupled to the one or more processing units, the memory storing instructions that based on execution by the one or more processing units, cause the one or more processing units to:
receive a selection from a user of two or more content items, each of the two or more content items having two or more common metadata attributes prior to the selection;
in response to the selection, automatically create a group including the two or more content items and display an icon representing the group, metadata of the icon including the two or more common metadata attributes of the two or more content items;
receive a drag and drop of the icon onto a visual representation of an additional content item; and
in response to the drag and drop, update metadata of the additional content item with the two or more common metadata attributes of the group.

12. The computing device of claim 11, wherein the instructions further cause the one or more processing units to display a visual indicator that the metadata of the additional content item has been updated with the two or more common metadata attributes of the group.

13. The computing device of claim 11, wherein the instructions further cause the one or more processing units to:
receive a user input comprising a second drag and drop of an additional metadata attribute onto the icon; and
in response to the user input, update the metadata of the group with the additional metadata attribute.

14. The computing device of claim 11, wherein the additional content item is a first version of the additional content item, and the instructions further cause the one or more processing units to:
in response to the drag and drop, cause a different computing device to update metadata of a second version of the additional content item with the two or more common metadata attributes of the group, the second version of the additional content item being stored in memory of the different computing device.

* * * * *